(12) United States Patent
Adams et al.

(10) Patent No.: US 10,645,114 B2
(45) Date of Patent: *May 5, 2020

(54) REMOTE REMEDIATION OF MALICIOUS FILES

(71) Applicant: Juniper Networks, Inc., Sunnyvale, CA (US)

(72) Inventors: Kyle Adams, Brisbane, CA (US); Daniel J. Quinlan, San Francisco, CA (US); Jacob Asher Langton, Oakland, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/659,028

(22) Filed: Jul. 25, 2017

(65) Prior Publication Data

US 2017/0324756 A1 Nov. 9, 2017

Related U.S. Application Data

(63) Continuation of application No. 14/674,794, filed on Mar. 31, 2015, now Pat. No. 9,729,572.

(51) Int. Cl.
*H04L 29/06* (2006.01)
*G06F 21/12* (2013.01)
(Continued)

(52) U.S. Cl.
CPC .......... *H04L 63/145* (2013.01); *G06F 21/126* (2013.01); *G06F 21/52* (2013.01);
(Continued)

(58) Field of Classification Search
CPC ...... G06F 21/52; G06F 21/566; G06F 21/126; H04L 63/145
See application file for complete search history.

(56) References Cited

U.S. PATENT DOCUMENTS 8,087,061 B2 12/2011 Jarrett
8,156,553 B1 4/2012 Church
(Continued)

OTHER PUBLICATIONS

Wu, Jeffrey; Arrott, Anthony; Osorio, Fernando C. Colon; "Protection against remote code execution exploits of popular applications in Windows", 9th International Conference on Malicious and Unwanted Software: The Americas (MALWARE), IEEE, Oct. 28-30, 2014, pp. 26-31.

(Continued)

*Primary Examiner* — Victor Lesniewski
(74) *Attorney, Agent, or Firm* — Harrity & Harrity, LLP (57) ABSTRACT

A device may determine that a file of a client device is a malicious file. The device may obtain remote access to the client device using a connection tool. The connection tool may provide access and control of the client device. The remote access may include access to a file location of the malicious file. The device may determine file information associated with the malicious file using the remote access to the client device. The device may select one or more remediation actions based on the file information. The device may cause the one or more remediation actions to be executed using the remote access to the client device.

20 Claims, 9 Drawing Sheets

(51) Int. Cl.
*G06F 21/52* (2013.01)
*G06F 21/56* (2013.01)
*H04L 29/08* (2006.01)

(52) U.S. Cl.
CPC .......... *G06F 21/566* (2013.01); *G06F 21/567* (2013.01); *G06F 21/568* (2013.01); *H04L 67/06* (2013.01)

(56) References Cited

U.S. PATENT DOCUMENTS

| | | | |
|---|---|---|---|
| 8,171,545 B1* | 5/2012 | Cooley | G06F 21/552 726/22 |
| 8,181,253 B1* | 5/2012 | Zaitsev | G06F 21/552 713/152 |
| 8,397,108 B1 | 3/2013 | Vannatter et al. | |
| 8,607,345 B1 | 12/2013 | Cruz | |
| 8,707,427 B2 | 4/2014 | Hooks et al. | |
| 8,806,275 B1 | 8/2014 | Vannatter et al. | |
| 9,098,333 B1 | 8/2015 | Obrecht | |
| 9,332,029 B1 | 5/2016 | Tikhonov | |
| 9,594,906 B1 | 3/2017 | Langton | |
| 9,729,572 B1 | 8/2017 | Adams et al. | |
| 2006/0010497 A1* | 1/2006 | O'Brien | G06Q 10/10 726/26 |
| 2006/0248522 A1* | 11/2006 | Lakshminarayanan | G06F 8/61 717/174 |
| 2007/0143851 A1* | 6/2007 | Nicodemus | G06F 11/3495 726/25 |
| 2007/0174915 A1 | 7/2007 | Gribble | |
| 2008/0115131 A1 | 5/2008 | Kelsey | |
| 2008/0120699 A1* | 5/2008 | Spear | H04L 63/10 726/4 |
| 2008/0208958 A1* | 8/2008 | Huff | G06F 11/30 709/203 |
| 2009/0049550 A1 | 2/2009 | Shevchenko | |
| 2009/0165132 A1 | 6/2009 | Jain | |
| 2010/0293610 A1* | 11/2010 | Beachem | G06F 21/552 726/15 |
| 2011/0060947 A1 | 3/2011 | Song | |
| 2011/0078797 A1* | 3/2011 | Beachem | G06F 21/53 726/25 |
| 2011/0202380 A1 | 8/2011 | Vera | |
| 2011/0202798 A1 | 8/2011 | Vera | |
| 2012/0102568 A1 | 4/2012 | Tarbotton | |
| 2012/0209983 A1* | 8/2012 | Bronner | G06F 9/4843 709/224 |
| 2012/0210427 A1* | 8/2012 | Bronner | H04L 63/30 726/23 |
| 2012/0233697 A1 | 9/2012 | Katardjiev | |
| 2012/0260304 A1* | 10/2012 | Morris | G06F 21/56 726/1 |
| 2012/0284571 A1* | 11/2012 | Stanko | H04L 43/0817 714/49 |
| 2013/0019306 A1* | 1/2013 | Lagar-Cavilla | G06F 21/566 726/22 |
| 2013/0111462 A1 | 5/2013 | Umansky | |
| 2013/0174214 A1* | 7/2013 | Duncan | G06F 11/3065 726/1 |
| 2013/0219493 A1* | 8/2013 | Banzhof | H04L 63/1433 726/22 |
| 2013/0254372 A1* | 9/2013 | Pierce | G06F 11/326 709/224 |
| 2013/0305368 A1 | 11/2013 | Ford | |
| 2014/0053267 A1 | 2/2014 | Klein | |
| 2014/0208425 A1* | 7/2014 | Palomaki | G06F 21/56 726/23 |
| 2014/0237590 A1 | 8/2014 | Shua | |
| 2014/0289853 A1 | 9/2014 | Teddy et al. | |
| 2015/0040231 A1* | 2/2015 | Oliphant | G06F 21/57 726/25 |
| 2015/0106945 A1 | 4/2015 | Wang | |
| 2015/0113652 A1 | 4/2015 | Ben-Itzhak | |
| 2015/0143454 A1 | 5/2015 | Lee | |
| 2015/0227742 A1 | 8/2015 | Pereira | |
| 2015/0261954 A1* | 9/2015 | Xue | G06F 21/554 726/23 |
| 2016/0034702 A1* | 2/2016 | Sikka | G06F 21/6218 726/27 |
| 2016/0099960 A1* | 4/2016 | Gerritz | H04L 63/145 726/23 |
| 2016/0127367 A1 | 5/2016 | Jevans | |
| 2016/0171215 A1 | 6/2016 | Bank | |

OTHER PUBLICATIONS

Liu, Yu-Feng; Zhang, Li-Wei; Liang, Jian; Qu, Sheng; Ni, Zhi-Qiang; "Detecting Trojan Horses Based on System Behavior Using Machine Learning Method", International Conference on Machine Learning and Cybernetics (ICMLC), IEEE, Jul. 11-14, 2010, pp. 855-860.

De Andrade, Cesar Augusto Borges; de Mello, Claudio Gomes; Duarte, Julio Cesar; "Malware Automatic Analysis", BRICS Congress Computational Intelligence and 11th Brazilian Congress on Computational Intelligence (BRICS-CCI & CBIC), IEEE, Sep. 8-11, 2013, pp. 681-686.

* cited by examiner

REMOTE REMEDIATION OF MALICIOUS FILES

RELATED APPLICATION

This application is a continuation of U.S. patent application Ser. No. 14/674,794, filed Mar. 31, 2015 (now U.S. Pat. No. 9,729,572), which is incorporated herein by reference.

BACKGROUND

A malicious file, such as malicious software ("malware"), may refer to any software used to disrupt computer operations, gather sensitive information, gain access to private computer systems, or the like. A malicious file may include a variety of types of hostile or intrusive software, including a computer virus, a worm, a Trojan horse, ransomware, spyware, adware, scareware, or other malicious software.

A client device may download a file that is a malicious file during operation of the client device. A malicious file detection tool associated with a security device may determine that the file is malicious based on performing analysis on the file while the file downloads to the client device. The file may be executed on the client device before the malicious file detection tool completes analysis on the file.

SUMMARY

According to some possible implementations, a device may determine that a file of a client device is a malicious file. The device may obtain remote access to the client device using a connection tool. The connection tool may provide access and control of the client device. The remote access may include access to a file location of the malicious file. The device may determine file information associated with the malicious file using the remote access to the client device. The device may select one or more remediation actions based on the file information. The device may cause the one or more remediation actions to be executed using the remote access to the client device.

According to some possible implementations, a computer-readable medium may store one or more instructions that, when executed by one or more processors cause the one or more processors to determine that a file of a client device is a malicious file. The file may have been at least partially analyzed to determine whether the file is a malicious file while the file is downloading to the client device. The one or more instructions may cause the one or more processors to obtain access to the client device using an operating system interface for an operating system of the client device. The one or more instructions may cause the one or more processors to determine, using the access to the client device, file information associated with the malicious file. The one or more instructions may cause the one or more processors to select one or more remediation actions, from a set of remediation actions, based on the file information. The one or more instructions may cause the one or more processors to cause the one or more remediation actions to be performed on the client device using the access to the client device.

According to some possible implementations, a method may include determining, by a device, that a file of a client device is a malicious file. The method may include determining, by the device, that the malicious file is manageable using remote access to the client device via an operating system interface for an operating system of the client device. The method may include obtaining, by the device, the remote access to the client device using the operating system interface. The method may include determining, by the device, file information associated with the malicious file using the remote access to the client device via the operating system interface. The method may include selecting, by the device, one or more remediation actions based on the file information. The method may include causing, by the device, the one or more remediation actions to be executed using the remote access to the client device via the operating system interface.

DETAILED DESCRIPTION

The following detailed description of example implementations refers to the accompanying drawings. The same reference numbers in different drawings may identify the same or similar elements.

A malicious file may include a ransomware file, a spyware file, or the like. Often the malicious file may be downloaded to a client device when a user intends to download a legitimate file, such as a software program, a data file, or the like. For example, the user may download a legitimate (non-malicious) file and may inadvertently download a malicious file while downloading the legitimate file. A malicious file prevention program may operate on the client device to scan downloaded files and identify whether the downloaded files include a malicious file. However, malicious file detection may require significant processing resources that may hinder operation of the client device. Moreover, some analysis, such as sandboxing, may be difficult to perform on the client device.

Consequently, a security device associated with the client device may perform malicious file detection on files being downloaded by the client device. Although the security device can perform the malicious file detection more rapidly than the client device, a download of a malicious file to the client device may be completed and the malicious file may begin execution before analysis is complete on the malicious file. Because of this, rapidity with which malicious files are remediated is important in minimizing damage caused by the malicious file. Implementations, described herein, may facilitate rapid remote remediation of detected malicious files on the client device by the security device. In this way, remediation actions may be performed prior to a particular malicious file causing significant damage to the client device, to a network that includes the client device, or the like.

Figure 1:
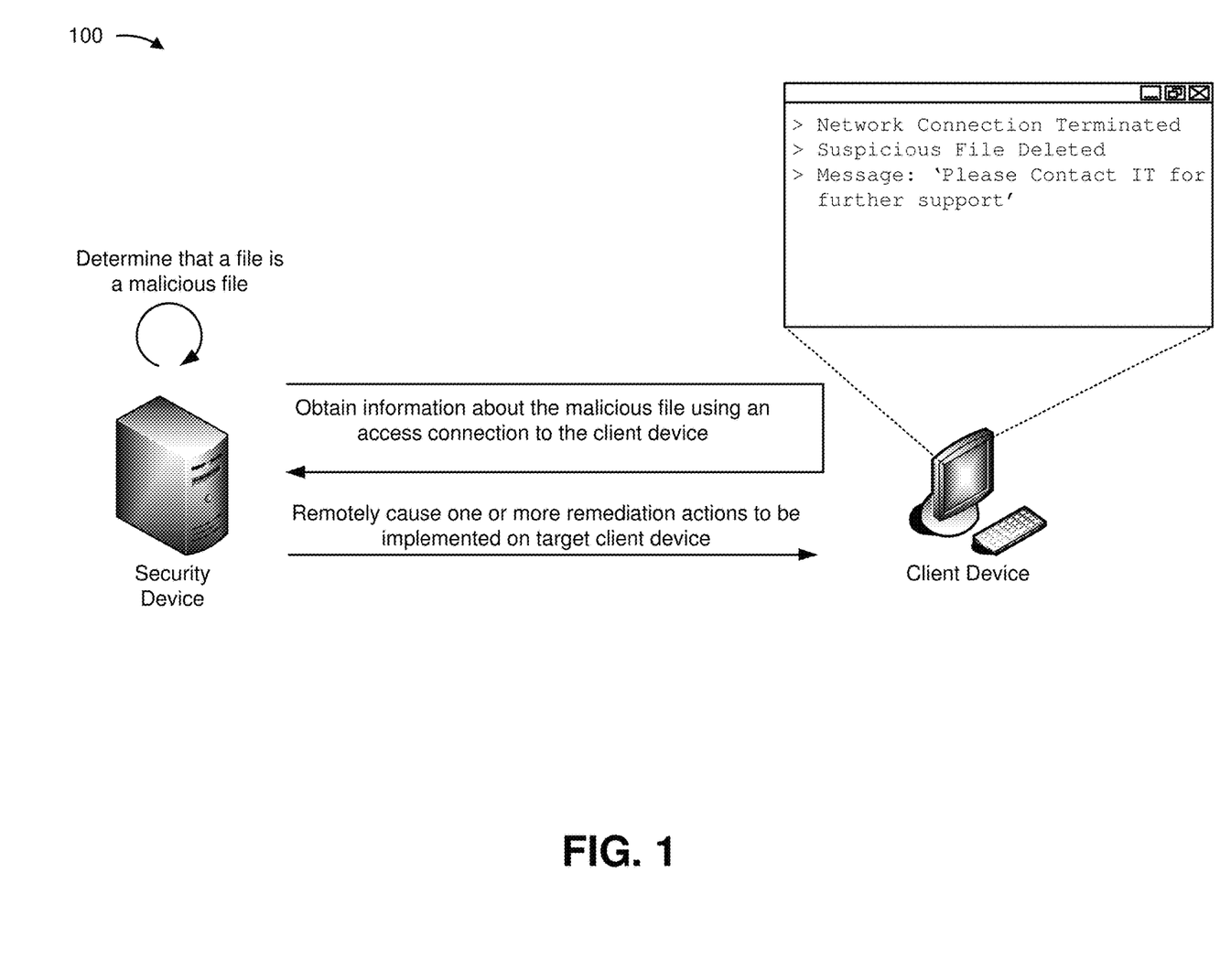
FIG. 1 is a diagram of an overview of an example implementation described herein.

FIG. 1 is a diagram of an overview of an example implementation 100 described herein. As shown in FIG. 1, a security device may utilize a malicious file detector to determine that a file is a malicious file. For example, the security device may operate a sandbox environment in which the malicious file is executed to determine functionality of the malicious file. The security device may perform detection while the malicious file is downloading to the client device. Based on determining that the file is a malicious file, the security device may utilize a connection tool to obtain access to the client device. For example, the security device may utilize windows management instrumentation (WMI) to obtain low-level access (e.g., administrator access) to the client device. In this case, the security device may access WMI using a connection tool. The low-level access may permit actions, such as pushing files to the client device, deleting a file from the client device, executing a file on the client device, scanning a file system of the client device, querying a process list of the client device, modifying a registry of the client device, altering a state of a network adapter of the client device, utilizing an administrator privilege of the client device, or the like.

As further shown in FIG. 1, the security device may utilize the access to the client device to obtain information regarding the malicious file. For example, using WMI, the security device may determine an access time, a modification time, or the like associated with the malicious file (e.g., from which the security device may determine whether the malicious file has been executed, is executing, etc.). The security device may select one or more remediation actions associated with remediating the malicious file. For example, based on a set of remediation rules, the security device may determine that for a particular malicious file, a network adapter of the client device is to be disabled, the particular malicious file is to be deleted, and a notification is to be provided to a user of the client device. The security device may cause the one or more selected remediation actions to be performed. For example, using WMI, the security device may alter the state of the network adapter, delete the malicious file, and provide a notification to the user (e.g., by changing a desktop background of the client device to display a notification message). In another example, the security device may perform a set of remediation actions that remediate the malicious file with the user of the client device noticing minimal alteration to performance on the client device (e.g., as compared with a malicious file removal tool operating on the client device).

In this way, the security device may utilize a remote access connection to a client device to determine a remediation action for a malicious file and/or implement the remediation action.

Figure 2:
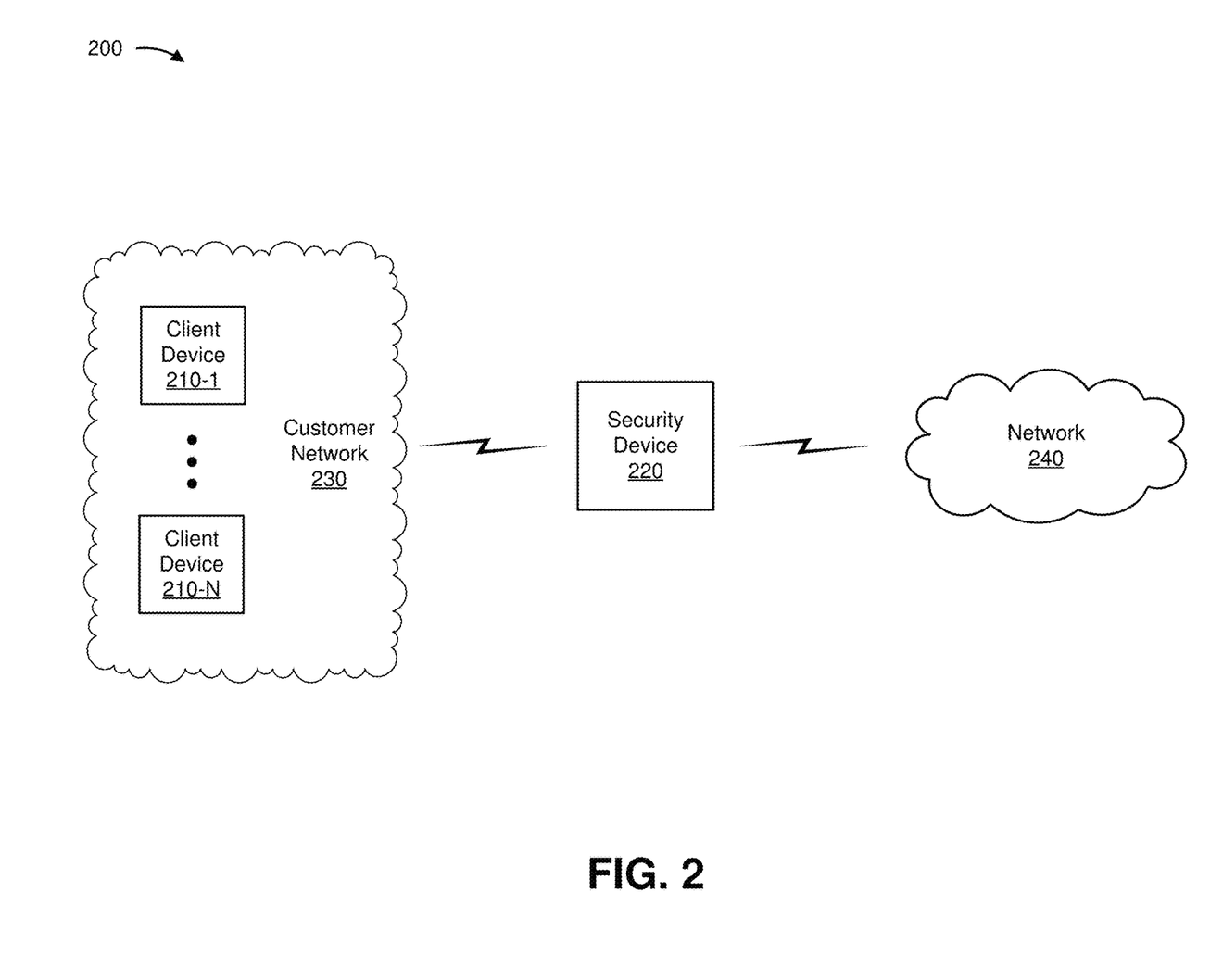
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, and a network 240. Devices of environment 200 may interconnect via wired connections, wireless connections, or a combination of wired and wireless connections.

Client device 210 may include one or more devices associated with a system configuration. For example, client device 210 may include a desktop computer, a laptop computer, a tablet computer, a mobile phone (e.g., a smart phone, a radiotelephone, etc.), a server, or a similar type of device. In some implementations, different client devices 210 may have different system configurations, and may be impacted by malicious files in different ways, some of the different ways being associated with different remediation techniques. In some implementations, client device 210 may be capable of executing a malicious file, which may cause harm to client device 210, information stored by client device 210, a user of client device 210, and/or another client device 210. In some implementations, client device 210 may reside on customer network 230.

Security device 220 may include one or more devices capable of processing and/or transferring network traffic associated with client device 210, and/or capable of providing a remediation service (e.g., a malicious file remediation service) for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. Additionally, or alternatively, communications may be routed to security device 220 when the communications are directed toward client device 210. In some implementations, security device 220 may determine whether a file is a malicious file. Additionally, or alternatively, security device 220 may be associated with another security device 220 that may determine whether a file is a malicious file and may provide an indication to security device 220.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
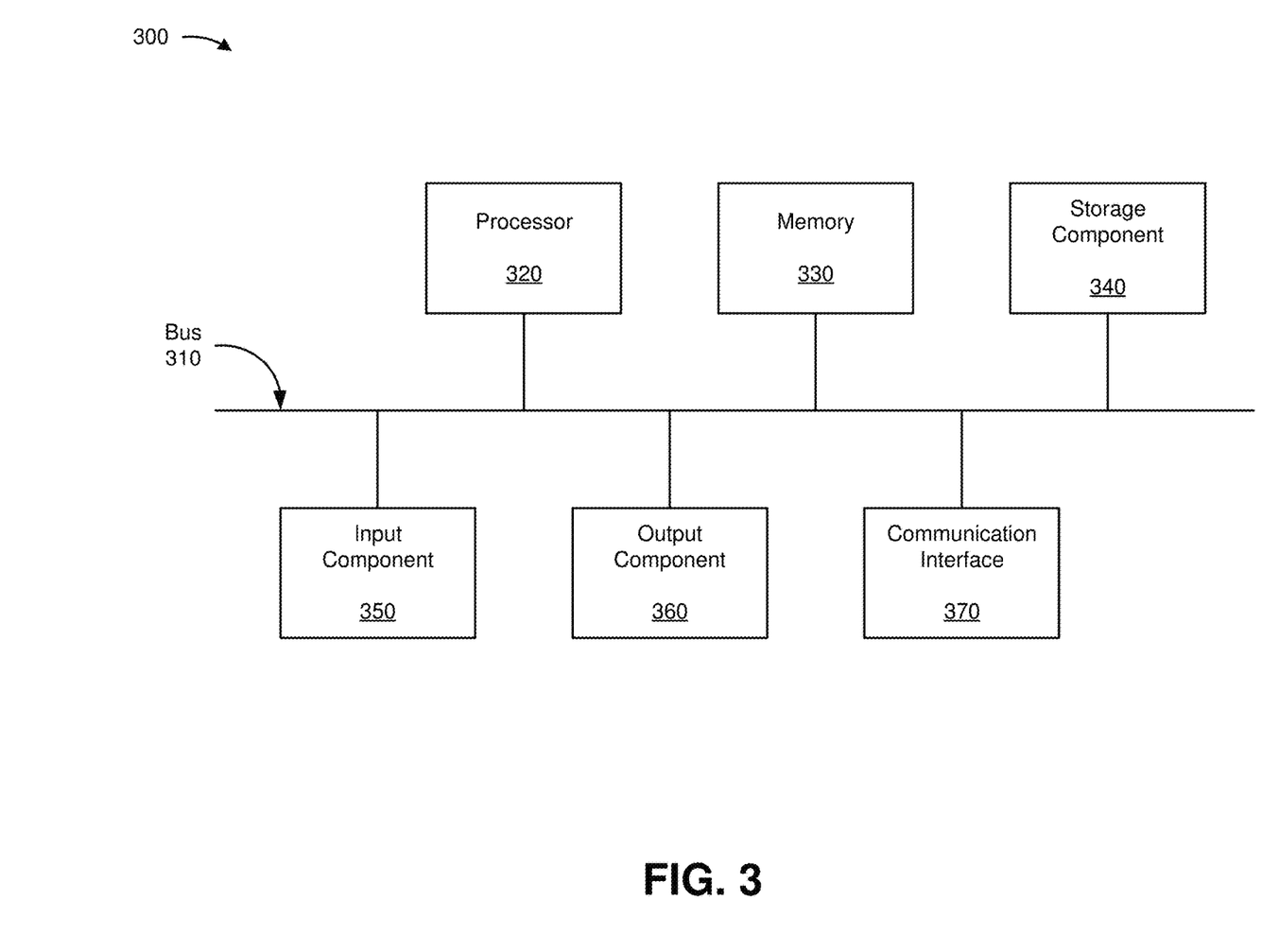
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
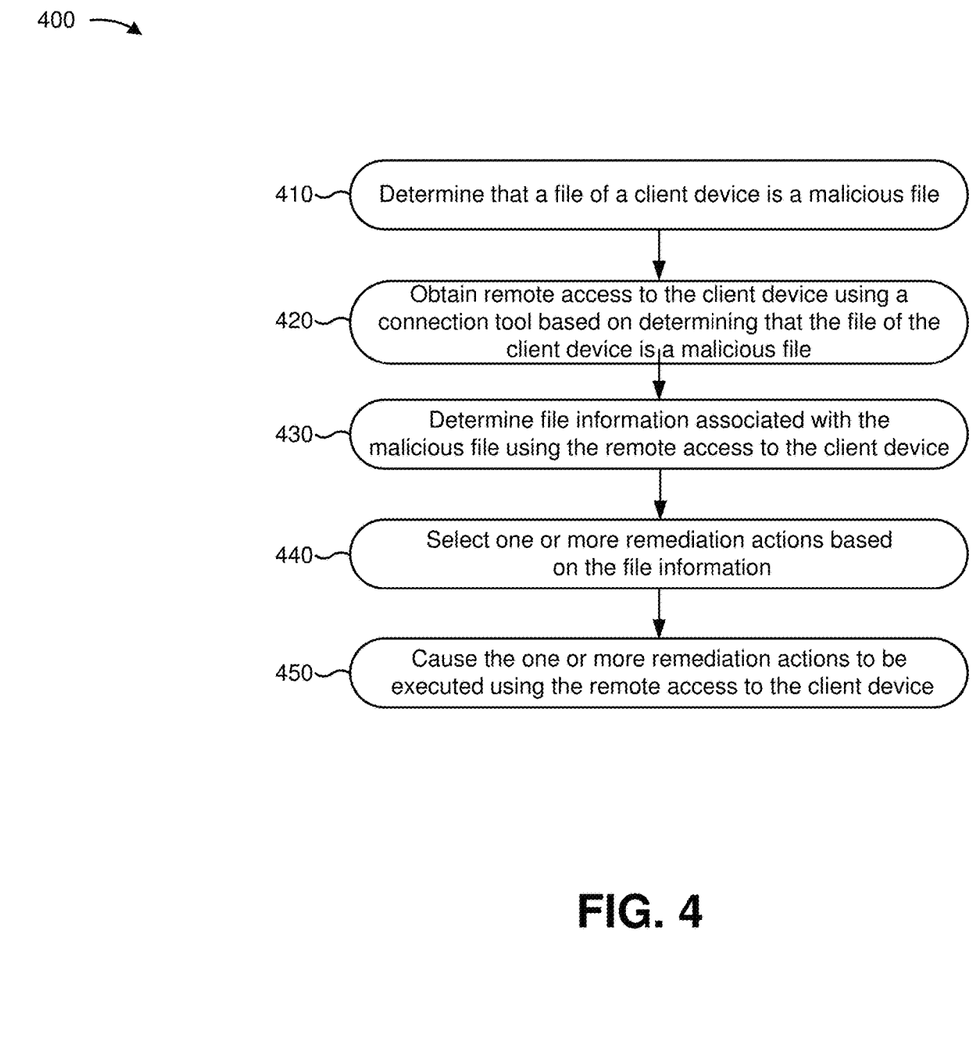
FIG. 4 is a flow chart of an example process for remotely remediating a malicious file on a client device.

FIG. 4 is a flow chart of an example process 400 for remotely remediating a malicious file on a client device. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include determining that a file of a client device is a malicious file (block 410). For example, security device 220 may determine that the file of client device 210 is a malicious file. In some implementations, security device 220 may receive the file before determining that the file is a malicious file. For example, security device 220 may receive the file from an application server providing downloading to client device 210, from a network device, from client device 210, or the like, and may determine that the file is a malicious file when the file is received. Additionally, or alternatively, security device 220 may determine that the file is a malicious file based on a trigger. For example, security device 220 may receive, from another security device 220, a detection device, or the like, an indication that the file is a malicious file and a trigger to perform remediation on client device 210. In some implementations, the other device may provide information identifying the malicious file, information identifying one or more possible remediation actions associated with the malicious file, or the like.

In some implementations, security device 220 may perform analysis on the file to determine whether the file is a malicious file. For example, security device 220 may assign a quantity of computing resources of security device 220 to analyze the file. In some implementations, analyzing the file may include sandboxing the file, executing the file, matching source code associated with the file, comparing the file against a set of known malicious files, identifying a malicious file purpose of the file (e.g., a malicious file purpose, such as stealing files from client device 210, utilizing computing resources of client device 210, disabling client device 210, etc.), or the like.

Security device 220 may determine that the file is a malicious file while the file is being downloaded to client device 210, in some implementations. For example, security device 220 may receive information (e.g., from a router, a switch, a hub, client device 210, or the like) regarding the file for analysis at least partially during downloading of the file to client device 210. In some implementations, security device 220 may determine that the file is a malicious file before downloading of the file to client device 210 is complete, and may perform a particular set of remediation techniques based on determining that the file is a malicious file before the downloading is complete. Additionally, or alternatively, security device 220 may determine that the file is a malicious file after the downloading to client device 210 is complete and/or after the file has been installed and/or executed on client device 210.

Additionally, or alternatively, security device 220 may determine that the file is a malicious file at another time. For example, security device 220 may determine that the file is a malicious file after the file has downloaded to client device 210, such as based on performing a remote scan of client device 210 to detect malicious files, based on a malicious file detection tool of client device 210 performing a scan of client device 210, or the like.

As further shown in FIG. 4, process 400 may include obtaining remote access to the client device using a connection tool based on determining that the file of the client device is a malicious file (block 420). For example, security device 220 may obtain access to client device 210 using the connection tool based on determining that the file of client device 210 is a malicious file. A connection tool may refer to a module that grants, to a first device, a particular level of access to a second device, allowing the first device to perform one or more tasks on the second device. For example, the connection tool (e.g., an operating system interface tool) may provide remote access and control of client device 210, such as via an operating system interface for an operating system of client device 210 (e.g., a Windows-based operating system, a Linux-based operating system, etc.). Further to this example, the connection tool may include a Windows management instrumentation (WMI) based connection tool, such as PowerShell. In this case, security device 220 may utilize a connection tool to access an interface of WMI, operating on client device 210, to control a functionality of client device 210.

Additionally, or alternatively, the connection tool may include an endpoint agent installed on client device 210. An endpoint agent may be utilized when security device 220 lacks authorization credentials for client device 210, and the endpoint agent may be installed on client device 210 to facilitate access by security device 220. Similarly, WMI may be utilized when WMI is pre-configured on client device 210 and security device 220 includes authorization credentials for utilizing an interface of WMI to access client device 210 (e.g., to access file locations of client device 210). In some implementations, security device 220 may receive authentication information including authorization credentials for client device 210 and may select a particular connection tool, of a set of connection tools, based on receiving the authentication information. In some implementations, security device 220 may obtain the remote access by requesting the remote access from a user of client device 210. For example, security device 220 may transmit a message to a user of client device 210 (e.g., via e-mail, a messaging service, a text message, or the like) with instructions for the user to open the remote access for security device 220. In this case, based on the user opening the remote access connection, security device 220 may utilize the remote access connection.

In some implementations, security device 220 may obtain the access to client device 210 based on determining that the malicious file is able to be remediated. For example, security device 220 may determine that a remediation action associated with remediating the malicious file is performable using a remote access connection to client device 210. Additionally, or alternatively, security device 220 may receive an indication from a detection device that the malicious file, identified by the detection device, is manageable by security device 220 with one or more of the remediation actions performable by security device 220.

Security device 220 may be granted access to different aspects of client device 210 and/or to perform different actions on client device 210, in some implementations. For example, security device 220 may be granted access to connect to client device 210, push a file onto client device 210, cause the file to be executed on client device 210, or the like. Additionally, or alternatively, security device 220 may be granted additional access to client device 210 (e.g., administrator level access) that permits security device 220 to scan a file system of client device 210, open a file, hash a file, obtain a hash of a file, delete a file, modify a file, obtain a set of processes being operated on client device 210, manipulate a registry, determine registry information (e.g., query the registry, etc.), obtain user identification information regarding a set of users utilizing client device 210, modify a user access, lock a user access, alter a state of a network adapter, determine information associated with execution of a file (e.g., whether the file has been executed, etc.), or the like. In some implementations, aspects of client device 210 to which security device 220 is granted access may be selected based on credentials possessed by security device 220. For example, security device 220 may utilize a data structure storing an authorization credential (e.g., an administrator credential) for client device 210 to obtain administrator level access to client device 210.

As further shown in FIG. 4, process 400 may include determining file information associated with the malicious file using the remote access to the client device (block 430). For example, security device 220 may determine file information associated with the malicious file using the access to client device 210. In some implementations, security device 220 may locate the malicious file in a data structure of client device 210. For example, security device 220 may query client device 210 to determine a file location of the malicious file.

In some implementations, security device 220 may determine information associated with execution of the malicious file, such as an access time, a modification time, or the like associated with the malicious file. For example, based on the access time and the modification time of the malicious file, security device 220 may determine that the file has been executed on client device 210. In some implementations, security device 220 may query a set of processes being executed on client device 210 to determine that the malicious file is executing on client device 210.

In some implementations, security device 220 may determine information regarding client device 210 when determining information associated with the malicious file. For example, security device 220 may determine information regarding a registry of client device 210, a state of a peripheral associated with client device 210 (e.g., a state of a network adapter, a state of an external data structure, etc.), or the like that may be utilized to select a remediation action (e.g., from a set of remediation actions performable by security device 220) for remediating the malicious file. Additionally, or alternatively, security device 220 may identify a user, of a set of users, who is utilizing client device 210. For example, security device 220 may determine that for a first user (e.g., a relatively low-priority user) a first remediation action (e.g., that interferes with utilization of client device 210) is to be performed; for a second user (e.g., a relatively high-priority user) a second remediation action (e.g., that does not interfere with utilization of client device 210) is to be performed; etc.

In some implementations, security device 220 may receive file information based on identifying the file as a malicious file. For example, a detection device may provide information, to security device 220, identifying a type of malicious file, a malicious file purpose, or the like. Additionally, or alternatively, security device 220 may receive file information based on querying a data structure storing information regarding the malicious file, such as by performing an Internet search for file information regarding the malicious file and/or similar malicious files, performing a search of another data structure (e.g., a malicious file database), or the like.

As further shown in FIG. 4, process 400 may include selecting one or more remediation actions based on the file information (block 440). For example, security device 220 may select the one or more remediation actions based on the file information. In some implementations, security device 220 may obtain information identifying the one or more remediation actions based on information stored in a remediation policy data structure. For example, the remediation policy data structure may include information indicating that when a particular malicious file has not been executed, a first remediation action is to be performed; when the particular malicious file is executing, a second remediation action is to be performed; etc.

In some implementations, security device 220 may utilize a machine learning technique, a pattern matching technique, information regarding other occurrences of the malicious file, or the like to select the one or more remediation actions. For example, security device 220 may utilize stored information indicating which remediation actions, of a set of remediation actions, were effective in remediating a similar malicious file during an occurrence of the similar malicious file to select the one or more remediation actions. In some implementations, security device 220 may select the one or more remediation actions based on a combination of multiple techniques, such as based on both a remediation policy and a machine learning technique, a pattern matching technique and information regarding other occurrences of the malicious file, or the like.

In some implementations, security device 220 may select the one or more remediation actions based on a level of access to client device 210. For example, a first remediation action may be performable when security device 220 is associated with a first level of access (e.g., non-administrator level access) and a second remediation action may be performable when security device 220 is associated with a second level of access (e.g., an administrator level access).

A remediation action may refer to a technique with which the malicious file may be managed. For example, security device 220 may delete the malicious file, stop execution of the malicious file, quarantine the malicious file, alter a state of a peripheral of client device 210 (e.g., disable a network adapter, a hard drive, or the like to contain the malicious file), or the like. Additionally, or alternatively, security device 220 may provide a notification to a user of client device 210 indicating that the file is a malicious file. For example, security device 220 may replace the malicious file with a notification file (e.g., indicating that an Information Technology (IT) agent has altered the malicious file, instructing a user to contact the IT agent, or the like), may alter a desktop background of client device 210 to a notification background, or the like. Additionally, or alternatively, security device 220 may push a file to client device 210 to remediate the malicious file. For example, security device 220 may push a sanitation tool associated with removing the malicious file to client device 210 and may cause the sanitation tool to be executed (e.g., using WMI-based remote access to client device 210). In some implementations, security device 220 may select a remediation action associated with quarantining client device 210 from other client devices 210 associated with customer network 230.

As further shown in FIG. 4, process 400 may include causing the one or more remediation actions to be executed using the remote access to the client device (block 450). For example, security device 220 may cause the one or more remediation actions to be executed using the access to client device 210. In some implementations, security device 220 may implement a remediation action of the one or more remediation actions. For example, security device 220 may push a file to client device 210, alter a state of a network adapter of client device 210, provide a notification to client device 210, or the like (e.g., using the access, such as the WMI-based access, to client device 210). Additionally, or alternatively, security device 220 may cause client device 210 to implement a remediation action. For example, security device 220 may cause client device 210 to execute a sanitation tool, display a notification, or the like.

In some implementations, security device 220 may notify a user of client device 210, when causing the one or more remediation actions to be executed. For example, client device 210 may cause a pop-up window to be activated to provide an alert to the user regarding the malicious file. In some implementations, security device 220 may provide a notification to a user device associated with an IT agent, an administrator, or the like indicating that the one or more remediation actions have been selected and executed.

In some implementations, security device 220 may cause a malicious file detector to run on client device 210 after causing the one or more remediation actions to be executed. For example, security device 220 may push malicious file detection software to client device 210 and may cause the malicious file detection software to be executed. Additionally, or alternatively, security device 220 may perform malicious file detection on client device 210 utilizing the remote access. In some implementations, security device 220 may provide a notification after causing the one or more remediation actions to be executed. For example, security device 220 may provide the notification, for display via client device 210, indicating that the malicious file is removed from client device 210. Additionally, or alternatively, security device 220 may close the remote access to client device 210 after causing the one or more remediation actions to be executed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of remotely remediating a malicious file on a client device.

Figure 5A:
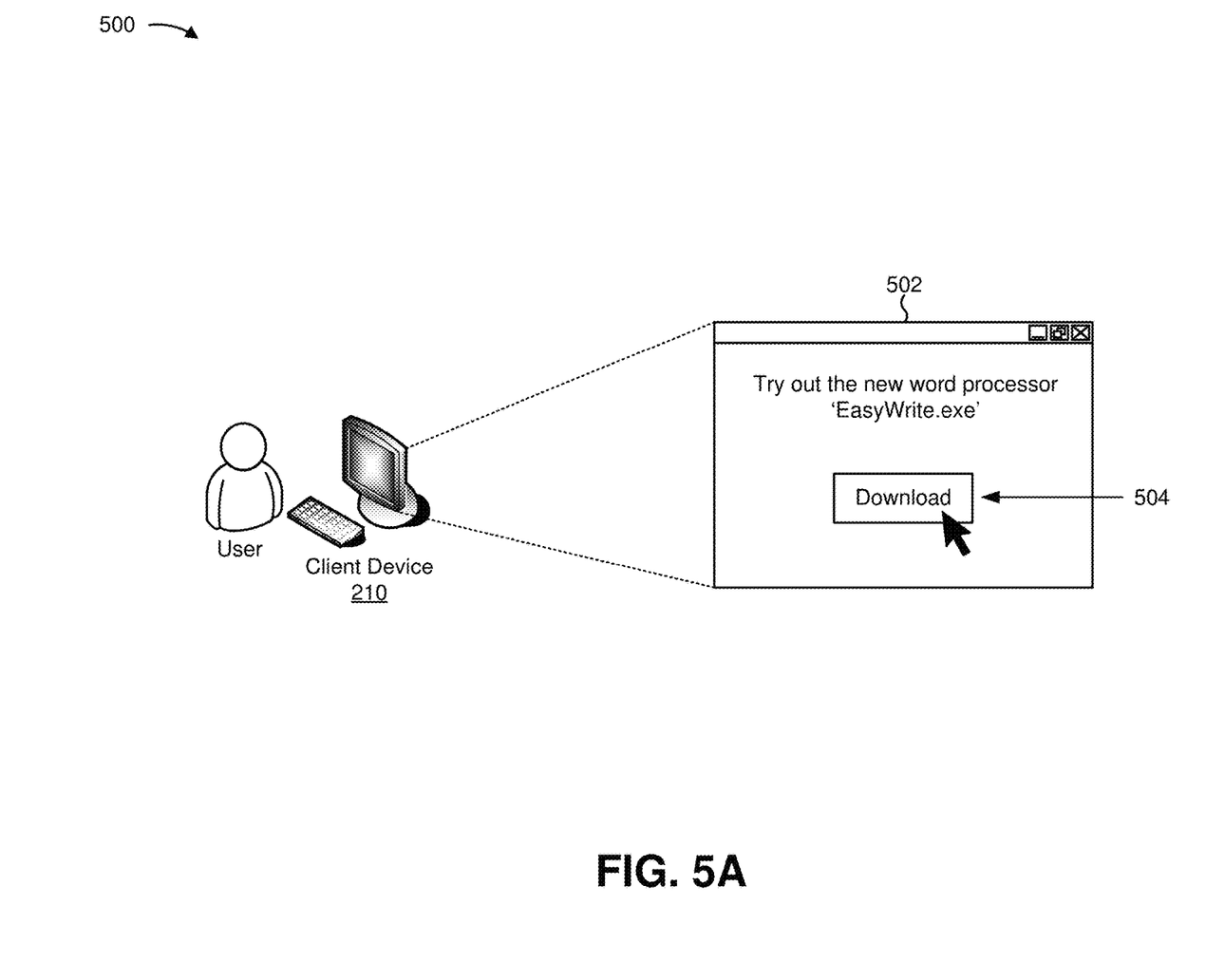
FIGS. 5A-5E are diagrams of an example implementation relating to the example process shown in FIG. 4.

As shown in FIG. 5A, and by reference number 502, a user of client device 210 may visit a website that a particular software file (e.g., "EasyWrite.exe") for download. As shown by reference number 504, the user may select to download the software file. Assume that the software file includes a malicious file (e.g., a hidden file, "FileThief.exe," that is downloaded in association with the software file).

Figure 5B:
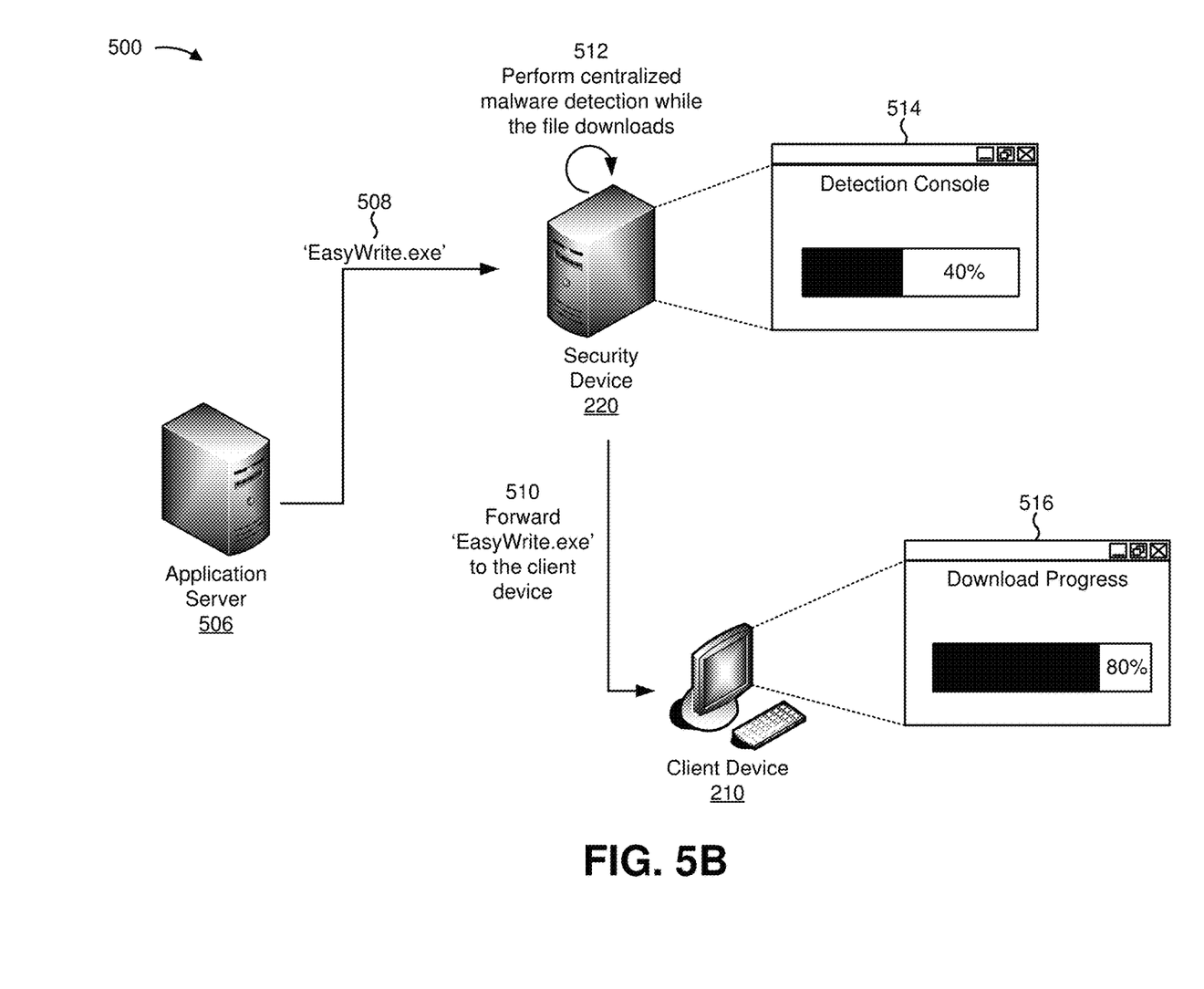

As shown in FIG. 5B, application server 506 provides the software file 508 (e.g., "EasyWrite.exe") to security device 220. As shown by reference number 510, security device 220 forwards software file 508 to client device 210. As shown by reference number 512, security device 220 performs malicious file detection on software file 508 while software file 508 is also downloading to client device 210. As shown by reference number 514, a detection console may provide information regarding detection progress to an IT agent. In another example, security device 220 may operate without an IT agent being present to monitor the detection console and/or provide input to security device 220. As shown by reference number 516, client device 210 provides information regarding progress in downloading software file 508. Assume that client device 210 completes downloading software file 508 before security device 220 completes performing malicious file detection on software file 508.

Figure 5C:
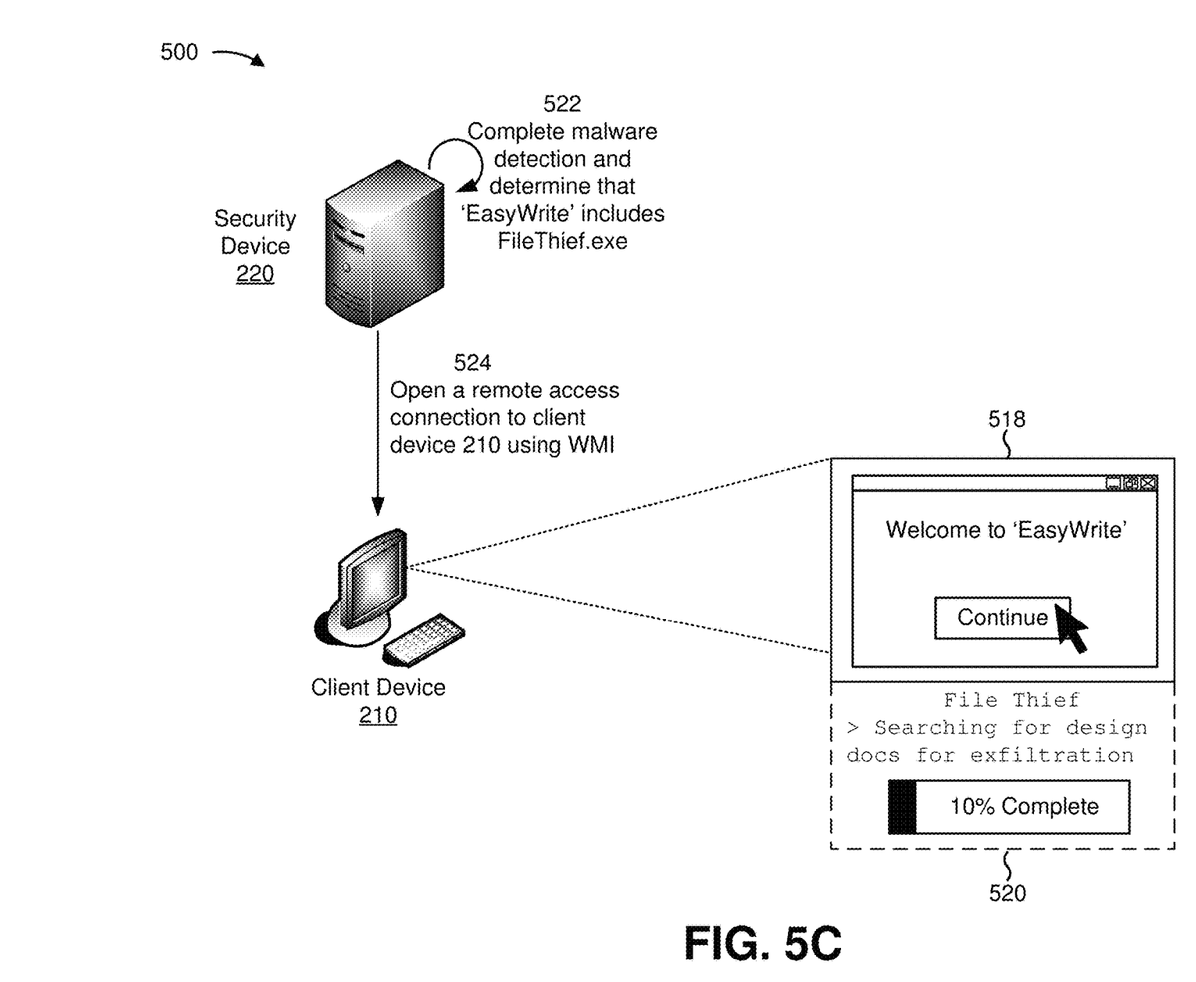

As shown in FIG. 5C, and by reference number 518, when client device 210 completes the download of software file 508, the user selects to execute software file 508. However, as shown by reference number 520, the user inadvertently executes a malicious file associated with software file 508 (e.g., "File Thief"). Assume that the malicious file begins searching client device 210 for a set of confidential design documents that the malicious file will exfiltrate to another device. As shown by reference number 522, security device 220 completes malicious file detection and determines that software file 508 includes the malicious file. Security device 220 automatically, and without user intervention, opens a remote access connection to client device 210 using WMI (e.g., by providing a set of login credentials to a login interface of WMI on client device 210).

Figure 5D:
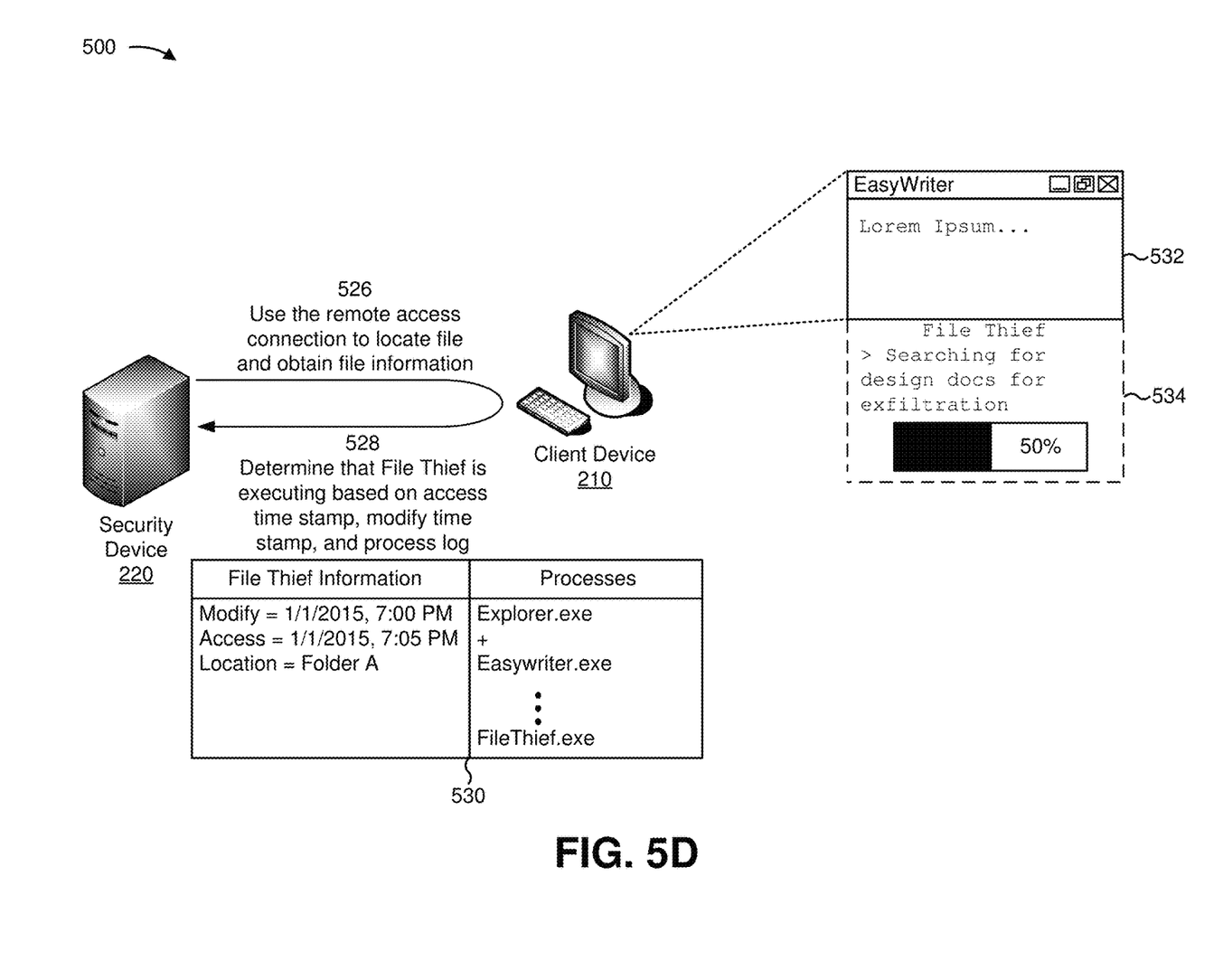

As shown in FIG. 5D, and by reference number 526, security device 220 utilizes the remote access connection to locate and obtain file information regarding the malicious file. As shown by reference number 528, based on the file information (shown by reference number 530), security device 220 determines that the malicious file is executing (e.g., based on determining that an access time stamp is later than a modification time stamp and based on a process log associated with client device 210). As shown by reference number 532, the user utilizes software file 508 while, as shown by reference number 534, the malicious file continues gathering the set of confidential design documents for exfiltration. Assume that a remediation policy data structure (e.g., that stores a remediation policy) associated with security device 220 includes information identifying a particular set of remediation actions for the malicious file when the malicious file is executing.

Figure 5E:
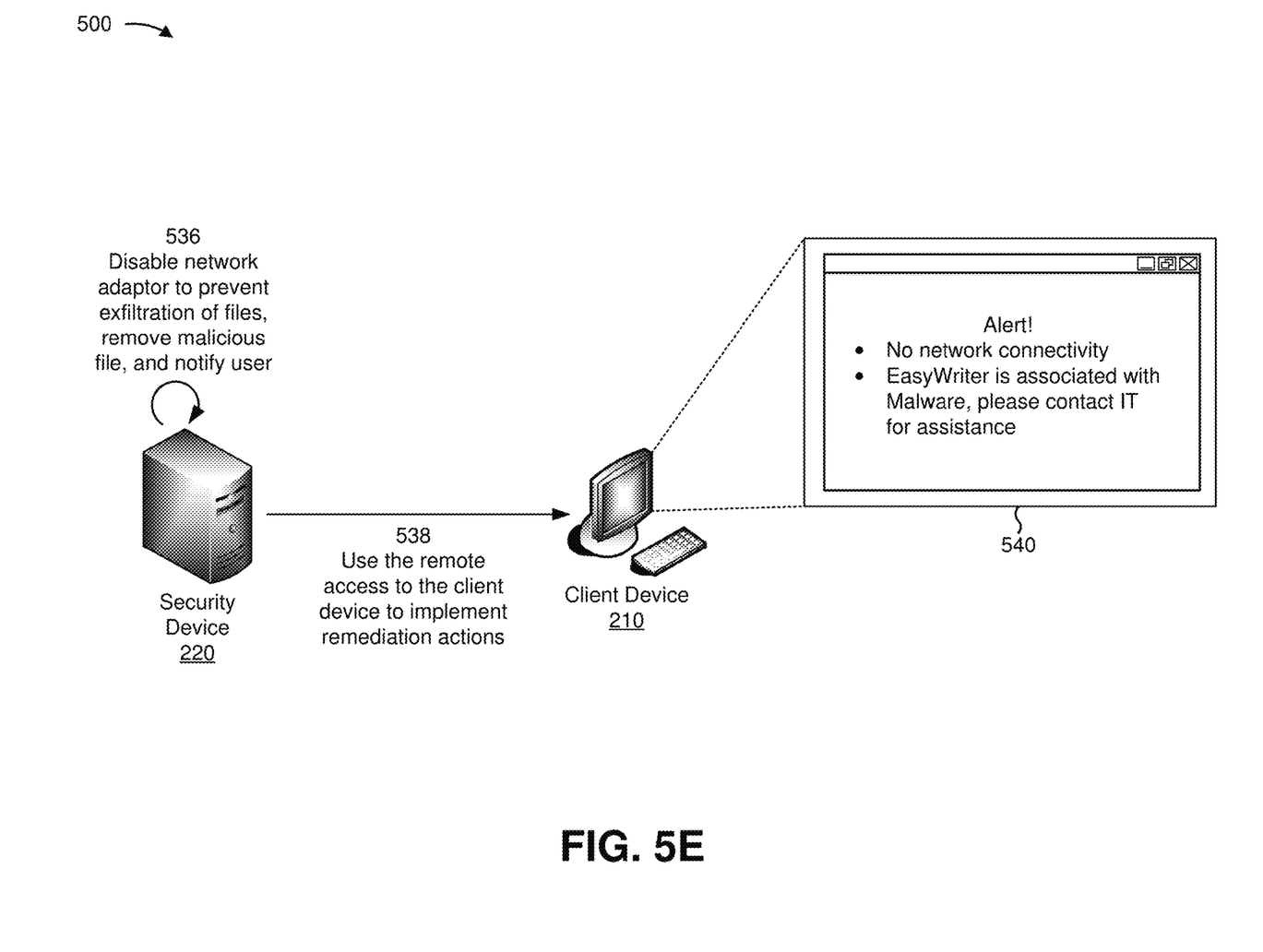

As shown in FIG. 5E, and by reference number 536, security device 220 identifies the set of remediation actions based on the information in the remediation policy data structure (e.g., disabling a network adapter of client device 210 to prevent exfiltration of the set of confidential design documents, removing the malicious file, and notifying the user). As shown by reference number 538, security device 220 utilizes the WMI-based access to implement the remediation actions (e.g., to disable the network adapter, remove the malicious file, and notify the user). As shown by reference number 540, client device 210 is caused to display an alert that network connectivity has been disabled (e.g., based on the network adapter being disabled by security device 220), an alert that software file 508 is associated with a malicious file, and an alert that IT can be contacted for further assistance. In another example, security device 220 may perform a set of remediation actions without the user being notified (e.g., such as by removing the malicious file without any alteration to software file 508, without disabling the network adapter, etc.).

As indicated above, FIGS. 5A-5E are provided merely as an example. Other examples are possible and may differ from what was described with regard to FIGS. 5A-5E.

In this way, a security device can utilize a remote access connection to obtain information regarding a malicious file of a client device and cause a set of remediation actions to be implemented on the client device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
analyze a file while the file is being downloaded by a client device,
a download of the file by the client device being completed before analysis of the file is completed;
determine that the file is a malicious file;
obtain remote access to the client device using a connection tool based on determining that the file is the malicious file,
the connection tool providing access and control of the client device by providing a set of login credentials to a login interface of the client device after determining that the file is the malicious file,
the remote access including access to a file location of the malicious file;
determine, using the remote access to the client device, whether an access time stamp is later than a modification time stamp for the malicious file;
determine a state of an external data structure associated with the client device;
select one or more remediation actions based on the file information and the state of the external data structure and whether the access time stamp is later than the modification time stamp for the malicious file,
where the one or more remediation actions disables a hard drive associated with the external data structure; and
cause the one or more remediation actions to be executed using the remote access to the client device,
where the one or more processors, when causing the one or more remediation actions to be executed, are to:
remotely disable the hard drive associated with the external data structure via the remote access to the client device.

2. The device of claim 1, where the one or more remediation actions are selected based on a user of the client device.

3. The device of claim 1, where the one or more processors are further to:
query a set of processes being executed on the client device; and
determine that the malicious file is executing on the client device based on the set of processes being executed,
where the one or more remediation actions are selected based on the malicious file executing on the client device.

4. The device of claim 1, where the one or more processors, when causing the one or more remediation actions to be executed using the remote access, are to:
push a sanitation tool to the client device,
the sanitation tool being associated with the malicious file; and
cause the client device to execute the sanitation tool, using the remote access, to remediate the malicious file.

5. The device of claim 1, where the one or more remediation actions are selected based on a level of access the device has to the client device.

6. The device of claim 1, where the one or more remediation actions are selected based on at least one of:
a remediation policy and a machine learning technique,
a pattern matching technique, or
information regarding other occurrences of the malicious file.

7. The device of claim 1, where the one or more processors are further to:
provide a notification indicating that the one or more remediation actions have been selected and executed.

8. A method, comprising:
analyzing, by a device, a file while the file is being downloaded by a client device,
a download of the file by the client device being completed before analysis of the file is completed;
determining, by the device, that the file is a malicious file;
obtaining, by the device, remote access to the client device using a connection tool based on determining that the file is the malicious file,
the connection tool providing access and control of the client device by providing a set of login credentials to a login interface of the client device after determining that the file is the malicious file,
the remote access including access to a file location of the malicious file;
determining, by the device and using the remote access to the client device, whether an access time stamp is later than a modification time stamp for the malicious file;
determining, by the device, a state of an external data structure associated with the client device;
selecting, by the device, one or more remediation actions based on the state of the external data structure and whether the access time stamp is later than the modification time stamp for the malicious file,
where the one or more remediation actions disables a hard drive associated with the external data structure; and
causing, by the device, the one or more remediation actions to be executed using the remote access to the client device,
where causing the one or more remediation actions to be executed includes:
remotely disabling the hard drive associated with the external data structure via the remote access to the client device.

9. The method of claim 8, where the one or more remediation actions are selected based on a user of the client device.

10. The method of claim 8, further comprising:
querying a set of processes being executed on the client device; and
determining that the malicious file is executing on the client device based on the set of processes being executed,
where the one or more remediation actions are selected based on the malicious file executing on the client device.

11. The method of claim 8, where causing the one or more remediation actions to be executed using the remote access includes:
pushing a sanitation tool to the client device,
the sanitation tool being associated with the malicious file; and
causing the client device to execute the sanitation tool, using the remote access, to remediate the malicious file.

12. The method of claim 8, where the one or more remediation actions are selected based on a level of access the device has to the client device.

13. The method of claim 8, where the one or more remediation actions are selected based on at least one of:
a remediation policy and a machine learning technique,
a pattern matching technique, or information regarding other occurrences of the malicious file.

14. The method of claim 8, further comprising:
providing a notification to a user device associated with an administrator indicating that the one or more remediation actions have been selected and executed.

15. A non-transitory computer-readable medium storing instructions, the instructions comprising:
one or more instructions that, when executed by one or more processors, cause the one or more processors to:
analyze a file while the file is being downloaded by a client device,
a download of the file by the client device being completed before analysis of the file is completed;
determine that the file is a malicious file;
obtain remote access to the client device using a connection tool based on determining that the file is the malicious file,
the connection tool providing access and control of the client device by providing a set of login credentials to a login interface of the client device after determining that the file is the malicious file,
the remote access including access to a file location of the malicious file;
determine, using the remote access to the client device, whether an access time stamp is later than a modification time stamp for the malicious file;
determine a state of an external data structure associated with the client device;
select one or more remediation actions based on the file information and the state of the external data structure and whether the access time stamp is later than the modification time stamp for the malicious file,
where the one or more remediation actions disables a hard drive associated with the external data structure; and
cause the one or more remediation actions to be executed using the remote access to the client device,
where the one or more instructions, that cause the one or more remediation actions to be executed, cause the one or more processors to:
remotely disable the hard drive associated with the external data structure via the remote access to the client device.

16. The non-transitory computer-readable medium of claim 15,
where the one or more remediation actions are selected based on a user of the client device.

17. The non-transitory computer-readable medium of claim 15, where the one or more instructions, when executed by the one or more processors, further cause the one or more processors to:
query a set of processes being executed on the client device; and
determine that the malicious file is executing on the client device based on the set of processes being executed,
where the one or more remediation actions are selected based on the malicious file executing on the client device.

18. The non-transitory computer-readable medium of claim 15, where the one or more instructions, when executed by the one or more processors, further cause the one or more processors to:
push a sanitation tool to the client device,
the sanitation tool being associated with the malicious file; and
cause the client device to execute the sanitation tool, using the remote access, to remediate the malicious file.

19. The non-transitory computer-readable medium of claim 15, where the one or more remediation actions are selected based on:
a remediation policy and a machine learning technique,
a pattern matching technique, or
information regarding other occurrences of the malicious file.

20. The non-transitory computer-readable medium of claim 15, wherein the one or more instructions, when executed by the one or more processors, further cause the one or more processors to:
provide a notification indicating that the one or more remediation actions have been selected and executed.

* * * * *

UNITED STATES PATENT AND TRADEMARK OFFICE
CERTIFICATE OF CORRECTION

PATENT NO. : 10,645,114 B2
APPLICATION NO. : 15/659028
DATED : July 25, 2017
INVENTOR(S) : Kyle Adams et al.

Page 1 of 1

It is certified that error appears in the above-identified patent and that said Letters Patent is hereby corrected as shown below:

In the Claims

Claim 1:
Column 13, Lines 24-25, change "select one or more remediation actions based on the file information and the state of the external data" to --select one or more remediation actions based on the state of the external data--

Claim 15:
Column 15, Lines 30-31, change "select one or more remediation actions based on the file information and the state of the external data" to --select one or more remediation actions based on the state of the external data--

Signed and Sealed this
Fifteenth Day of December, 2020

Andrei Iancu
*Director of the United States Patent and Trademark Office*